United States Patent
Zhou

(10) Patent No.: US 10,728,050 B2
(45) Date of Patent: Jul. 28, 2020

(54) METHOD OF TERMINAL-BASED CONFERENCE LOAD-BALANCING, AND DEVICE AND SYSTEM UTILIZING SAME

(71) Applicant: ZTE CORPORATION, Shenzhen, Guangdong Province (CN)

(72) Inventor: Yunwu Zhou, Shenzhen (CN)

(73) Assignee: ZTE CORPORATION (CN)

( * ) Notice: Subject to any disclaimer, the term of this patent is extended or adjusted under 35 U.S.C. 154(b) by 14 days.

(21) Appl. No.: 15/579,951

(22) PCT Filed: Feb. 25, 2016

(86) PCT No.: PCT/CN2016/074582
§ 371 (c)(1),
(2) Date: Dec. 6, 2017

(87) PCT Pub. No.: WO2016/197628
PCT Pub. Date: Dec. 15, 2016

(65) Prior Publication Data
US 2018/0227139 A1 Aug. 9, 2018

(30) Foreign Application Priority Data
Jun. 10, 2015 (CN) .......................... 2015 1 0317794

(51) Int. Cl.
*G06F 15/16* (2006.01)
*H04L 12/18* (2006.01)
(Continued)

(52) U.S. Cl.
CPC .......... *H04L 12/1827* (2013.01); *H04L 67/32* (2013.01); *H04N 7/15* (2013.01);
(Continued)

(58) Field of Classification Search
CPC ............... H04L 12/1827; H04L 65/403; H04L 12/1818; H04L 67/32; H04L 67/10;
(Continued)

(56) References Cited

U.S. PATENT DOCUMENTS

| 2008/0112337 A1 | 5/2008 | Shaffer et al. |
| 2010/0034367 A1* | 2/2010 | Das .......................... H04L 47/72 379/202.01 |

(Continued)

FOREIGN PATENT DOCUMENTS

| CN | 1976435 A | 6/2007 |
| CN | 101047531 A | 10/2007 |

(Continued)

OTHER PUBLICATIONS

IBM, Method and system for workload routing in a cloud, IP.com Priori Art Database, Nov. 17, 2009, IPCOM000190107D. XP13135409A.

*Primary Examiner* — Oleg Survillo
(74) *Attorney, Agent, or Firm* — McDonald Hopkins LLC

(57) ABSTRACT

The present disclosure provides a method, a device and a system for balancing a load of a terminal-based conference. Herein, the method includes: a scheduler receives a call resource and a media resource reported by a server; the scheduler receives a call resource request of the server, and the scheduler allocates an idle call resource access node in the call resource to a terminal managed by the server according to the call resource request; the scheduler receives a media resource request of a call node corresponding to the call resource access node, and the scheduler allocates an idle media resource access node in the media resource to the terminal according to the media resource request.

11 Claims, 4 Drawing Sheets

(51) Int. Cl.
  *H04N 7/15*       (2006.01)
  *H04L 29/08*      (2006.01)
  *G06F 9/50*       (2006.01)

(52) U.S. Cl.
  CPC ........... *H04N 7/152* (2013.01); *G06F 9/5072* (2013.01); *H04L 12/1818* (2013.01); *H04L 67/10* (2013.01); *H04L 67/1012* (2013.01)

(58) Field of Classification Search
  CPC ...... H04L 67/1012; H04N 7/152; H04N 7/15; G06F 9/5072
  See application file for complete search history.

(56) References Cited

U.S. PATENT DOCUMENTS

| | | | |
|---|---|---|---|
| 2012/0221642 | A1 | 8/2012 | Sekaran et al. |
| 2014/0280595 | A1* | 9/2014 | Mani ................... H04L 12/1827 709/204 |
| 2014/0341088 | A1* | 11/2014 | Niemi ............... H04L 29/12009 370/261 |
| 2015/0169374 | A1* | 6/2015 | Swindle ................ G06F 9/5088 718/104 |

FOREIGN PATENT DOCUMENTS

| | | |
|---|---|---|
| CN | 102025971 A | 4/2011 |
| CN | 102571686 A | 7/2012 |
| WO | 2014150992 A1 | 9/2014 |

\* cited by examiner

METHOD OF TERMINAL-BASED CONFERENCE LOAD-BALANCING, AND DEVICE AND SYSTEM UTILIZING SAME

TECHNICAL FIELD

The present disclosure relates to the field of communication, in particular to a method, a device and a system for balancing a load of a terminal-based conference.

BACKGROUND

At present, video conferences have already stepped into the field of Internet, and distributable and cloud deployment is realized. Therefore, inevitably call resources and media resources of conferences are required to be distributable and extensible such that the call resources and the media resources can be optimally used.

In the related art, cloud conferences limit the number of access users, and the access of users at any time and any places cannot be comprehensively realized. Moreover, the advantages are not greatly achieved in aspect of resource allocation, and when the users are overloaded, the concurrent access of a great number of users cannot be very well satisfied.

Up to now, no effective solution has already been put forward aiming at the problem that the number of the users accessing a video conference system is limited in the related art.

SUMMARY

The present disclosure provides a method, a device and a system for balancing a load of a terminal-based conference, to at least solve the problem that the number of users accessing a video conference system is limited in the related art.

According to one embodiment of the present disclosure, the present disclosure provides a method for balancing a load of a terminal-based conference, including that:

a scheduler receives a call resource and a media resource reported by a server;

the scheduler receives a call resource request of the server, and the scheduler allocates an idle call resource access node in the call resource to a terminal managed by the server according to the call resource request; and the scheduler receives a media resource request of a call node corresponding to the call resource access node, and the scheduler allocates an idle media resource access node in the media resource to the terminal according to the media resource request.

In an embodiment of the present disclosure, before the scheduler receives the call resource and the media resource reported by the server, the method includes:

the scheduler sends a call media resource request to the server; herein the call media resource request is used for indicating the server to report the call resource and the media resource to the scheduler.

In an embodiment of the present disclosure, before the scheduler receives the call resource and the media resource reported by the server, the method includes:

the scheduler receives the call resource and the media resource cyclically reported by the server according to preset time.

In an embodiment of the present disclosure, the step that the scheduler allocates an idle call resource access node in the call resource to a terminal managed by the server includes:

the scheduler allocates an idle call resource access node in the call resource to the terminal according to a routing configuration rule of an area to which the server belongs.

In an embodiment of the present disclosure, the method includes:

under a situation that there is no idle call resource access node in a call resource of the area, the scheduler allocates an idle call resource access node in the call resource to the terminal according to a routing configuration rule of a neighboring area of the server.

In an embodiment of the present disclosure, the step that the scheduler allocates an idle media resource access node in the media resource to the terminal includes:

the scheduler allocates an idle media resource access node to the terminal according to an allocation rule of the media resource of an area to which the call resource access node belongs.

In an embodiment of the present disclosure, the method includes:

under a situation that there is no idle media resource access node in the media resource of the area, the scheduler allocates an idle media resource access node to the terminal according to an allocation rule of the media resource of a neighboring area of the call resource access node.

According to another embodiment of the present disclosure, the present disclosure further provides a device for balancing a load of a terminal-based conference, including a receiving module, a call allocation module and a media allocation module.

The receiving module is configured to receive a call resource and a media resource reported by a server.

The call allocation module is configured to receive a call resource request of the server, and allocate, by the scheduler, an idle call resource access node in the call resource to a terminal managed by the server according to the call resource request.

The media allocation module is configured to receive a media resource request of a call node corresponding to the call resource access node, and allocate, by the scheduler, an idle media resource access node in the media resource to the terminal according to the media resource request.

In an embodiment of the present disclosure, the device further includes a request module.

The request module is configured to send a call media resource request to the server. Herein, the call media resource request is used for indicating the server to report the call resource and the media resource to the device.

In an embodiment of the present disclosure, the device further includes a report module.

The report module is configured to receive the call resource and the media resource cyclically reported by the server according to preset time.

In an embodiment of the present disclosure, the call allocation module includes a first call allocation unit.

The first call allocation unit is configured to allocate an idle call resource access node in the call resource to the terminal according to a routing configuration rule of an area to which the server belongs.

In an embodiment of the present disclosure, the call allocation module includes a second call allocation unit.

The second call allocation unit is configured to, under a situation that there is no idle call resource access node in a call resource of the area, allocate an idle call resource access node in the call resource to the terminal according to a routing configuration rule of a neighboring area of the server.

In an embodiment of the present disclosure, the media allocation module includes a first media allocation unit.

The first media allocation unit is configured to allocate an idle media resource access node to the terminal according to an allocation rule of the media resource of an area to which the call resource access node belongs.

In an embodiment of the present disclosure, the media allocation module includes a second media allocation unit.

The second media allocation unit is configured to, under a situation that there is no idle media resource access node in the media resource of the area, allocate an idle media resource access node to the terminal according to an allocation rule of the media resource of a neighboring area of the call resource access node.

According to another embodiment of the present disclosure, the present disclosure further provides a system for balancing a load of a terminal-based conference, including: a scheduler, a server and a terminal.

The scheduler receives a call resource and a media resource reported by the server.

The scheduler receives a call resource request of the server, and the scheduler allocates an idle call resource access node in the call resource to the terminal managed by the server according to the call resource request.

The scheduler receives a media resource request of a call node corresponding to the call resource access node, and the scheduler allocates an idle media resource access node in the media resource to the terminal according to the media resource request.

Through the present disclosure, the scheduler receives the call resource and the media resource reported by the server; the scheduler receives the call resource request of the server, and the scheduler allocates the idle call resource access node in the call resource to the terminal managed by the server according to the call resource request; the scheduler receives the media resource request of the call node corresponding to the call resource access node, and the scheduler allocates the idle media resource access node in the media resource to the terminal according to the media resource request. Therefore, the problem that the number of users accessing a video conference system is limited is solved, and the demand that a great number of users access a conference is satisfied.

BRIEF DESCRIPTION OF DRAWINGS

The drawings described here are used for providing further understanding about the present disclosure and constitute a part of the present application. The exemplary embodiments of the present disclosure and the description thereof are used for explaining the present disclosure instead of improperly limiting the present disclosure. In the drawings.

DETAILED DESCRIPTION

The present disclosure will be described below in detail with reference to the drawings in combination with the embodiments. It needs to be stated that the embodiments in the present application and the features in the embodiments may be mutually combined under a situation of no conflict.

It needs to be stated that terms such as "first" and "second" and the like in the description, the claims and the drawings of the present disclosure are used for distinguishing similar objects instead of necessarily describing specific orders or sequences.

Figure 1:
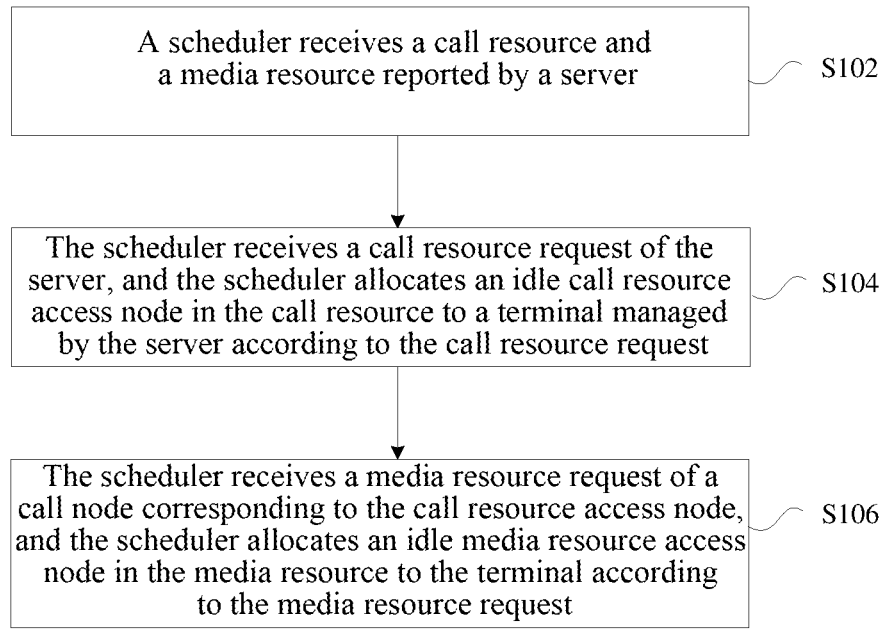
FIG. 1 illustrates a flowchart of a method for balancing a load of a terminal-based conference according to an embodiment of the present disclosure.

This embodiment provides a method for balancing a load of a terminal-based conference. FIG. 1 illustrates a flowchart of a method for balancing a load of a terminal-based conference according to the embodiment of the present disclosure. As illustrated in FIG. 1, the method includes the following steps.

In step S102, a scheduler receives a call resource and a media resource reported by a server.

In step S104, the scheduler receives a call resource request of the server, and the scheduler allocates an idle call resource access node in the call resource to a terminal managed by the server according to the call resource request.

In step S106, the scheduler receives a media resource request of a call node corresponding to the call resource access node, and the scheduler allocates an idle media resource access node in the media resource to the terminal according to the media resource request.

Through the above-mentioned steps, the scheduler receives the call resource and the media resource reported by the server, and allocates the idle call resource access node and the idle media resource access node to the terminal managed by the server according to the received call resource request and media resource request of the server, and effectively schedules the call resource and the media resource on the server. Therefore, the problem that the number of users accessing a video conference system is limited is solved, and the demand that a great number of users access a conference is satisfied.

In the embodiment of the present disclosure, before the scheduler receives the call resource and the media resource reported by the server, the scheduler may further send a call media resource request to the server. Herein, the media resource request is used for indicating the server to report the call resource and the media resource to the scheduler. The scheduler may further receive the call resource and the media resource cyclically reported by the server according to preset time.

In this embodiment, the scheduler may allocate the idle call resource access node in the call resource to the terminal managed by the server by adopting various modes. The various modes include the following modes:

the scheduler may allocate the idle call resource access node in the call resource to the terminal according to a routing configuration rule of an area to which the server belongs; and under a situation that there is no idle call resource access node in the call resource of the area, the scheduler allocates the idle call resource access node in the call resource to the terminal according to a routing configuration rule of a neighboring area of the server.

In this embodiment, the scheduler may allocate the idle media resource access node in the media resource to the terminal by adopting various modes. The various modes include the following modes:

the scheduler may allocate the idle media resource access node to the terminal according to an allocation rule of the media resource of an area to which the call resource access node belongs; and under a situation that there is no idle media resource access node in the media resource of the area, the scheduler allocates the idle media resource access node to the terminal according to an allocation rule of the media resource of a neighboring area of the call resource access node.

An embodiment further provides a device for balancing a load of a terminal-based conference. The device is used for implementing the above-mentioned embodiment and alternative implementation modes, and the content which has already been described is not repetitively described here. As used below, the term "module" may be a combination of software and/or hardware for realizing predetermined functions. Although the device described in the following embodiments is preferably implemented by means of software, the implementation by means of hardware or the combination of software and hardware is also possible and may be conceived.

Figure 2:
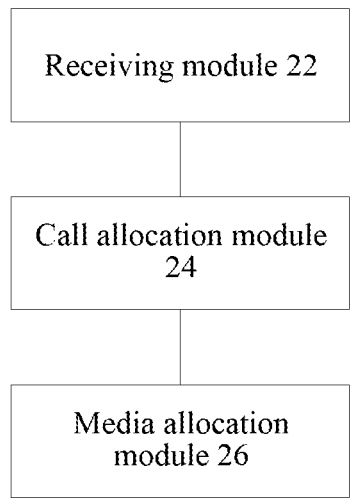
FIG. 2 illustrates a structural block diagram of a device for balancing a load of a terminal-based conference according to an embodiment of the present disclosure.

FIG. 2 illustrates a structural block diagram of a device for balancing a load of a terminal-based conference according to an embodiment of the present disclosure. As illustrated in FIG. 2, the device includes a receiving module 22, a call allocation module 24 and a media allocation module 26.

The receiving module 22 is configured to receive a call resource and a media resource reported by a server.

The call allocation module 24 is configured to receive a call resource request of the server, and allocate an idle call resource access node in the call resource to a terminal managed by the server according to the call resource request.

The media allocation module 26 is configured to receive a media resource request of a call node corresponding to the call resource access node, and allocate an idle media resource access node in the media resource to the terminal according to the media resource request.

Through the above-mentioned device, the scheduler receives the call resource and the media resource reported by the server, and allocates the idle call resource access node and the idle media resource access node to the terminal managed by the server according to the received call resource request and media resource request of the server, and effectively schedules the call resource and the media resource on the server. Therefore, the problem that the number of users accessing a video conference system is limited is solved, and the demand that a great number of users access a conference is satisfied.

In the embodiment of the present disclosure, the device further includes a request module and a report module.

The request module is configured to send a call media resource request to the server. Herein, the media resource request is used for indicating the server to report the call resource and the media resource to the device.

The report module is configured to receive the call resource and the media resource cyclically reported by the server according to preset time.

In the embodiment of the present disclosure, the call allocation module 24 includes a first call allocation unit and a second call allocation unit.

The first call allocation unit is configured to allocate an idle call resource access node in the call resource to the terminal according to a routing configuration rule of an area to which the server belongs.

The second call allocation unit is configured to, under a situation that there is no idle call resource access node in the call resource of the area, allocate an idle call resource access node in the call resource to the terminal according to a routing configuration rule of a neighboring area of the server.

In the embodiment of the present disclosure, the media allocation module 26 includes a first media allocation unit and a second media allocation unit.

The first media allocation unit is configured to allocate an idle media resource access node to the terminal according to an allocation rule of the media resource of an area to which the call resource access node belongs.

The second media allocation unit is configured to, under a situation that there is no idle media resource access node in the media resource of the area, allocate an idle media resource access node to the terminal according to an allocation rule of the media resource of a neighboring area of the call resource access node.

An embodiment of the present disclosure further provides a system for balancing a load of a terminal-based conference, including: a scheduler, a server and a terminal.

The scheduler receives a call resource and a media resource reported by the server.

The scheduler receives a call resource request of the server, and the scheduler allocates an idle call resource access node in the call resource to the terminal managed by the server according to the call resource request.

The scheduler receives a media resource request of a call node corresponding to the call resource access node, and the scheduler allocates an idle media resource access node in the media resource to the terminal according to the media resource request.

The present disclosure will be described below in detail in combination with alternative embodiments and implementation modes.

Through the alternative embodiments of the present disclosure, when excessive terminals access a cloud conference, the call resource and the media resource can be seamlessly allocated to other servers with idle resources, and thereby the problem in the application scenario of concurrent access of a great number of users is solved.

The technical method adopted by the alternative embodiment includes the following steps.

In step 1, when a call media resource scheduler is powered on, a cloud server is powered to be requested for reporting a call media resource, and the cloud server allocates call resource elements and media resource elements according to resources such as CPU core number and internal memory of the cloud server, and reports the call resource elements and media resource elements to the call media resource scheduler.

In step 2, when the cloud server detects that a conference television terminal accesses, the cloud server acquires an idle call resource access node from the call media resource scheduler, and otherwise, the cloud server requests the call media resource scheduler periodically for reporting idle resources.

In step 3, after the call media resource scheduler receives a call resource access node request message, firstly an idle call resource element is allocated according to an area code. If resource elements corresponding to the area code have already been fully used, an idle call resource element is allocated from an area. If there is no idle call resource element in this area, an idle call resource element for access is allocated from another area. If resources of all areas have already been used up, the call access is directly rejected; and otherwise, the call media resource scheduler tells an address of the call resource allowing for access to the terminal.

In step 4, the terminal acquires an idle media resource access node from the call media resource scheduler through the call resource access node allocated in step C.

In step 5, after the call media resource scheduler receives a media node request message, firstly the corresponding idle media resource element is selected according to an access media capability; if a media node is found, the call media resource scheduler tells an address of the media node to the terminal; and otherwise, the access is directly rejected.

Through the above-mentioned embodiment, when resources are overloaded in a cloud conference, the call resource and the media resource can be allocated in balance, such that the conference resources are optimally used, and the high-capacity concurrent normal access of users is guaranteed.

Figure 3:
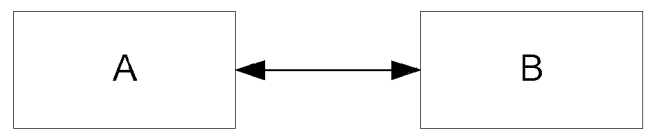
FIG. 3 illustrates a schematic diagram of a common two-point conference in the related art.

FIG. 3 illustrates a schematic diagram of a common two-point conference in the related art. As illustrated in FIG. 3, A and B both are common terminals. Since it is just a simple point-to-point conference and there is no situation of access of other terminals after resources are used up, a load balancing of call media resources does not need to be realized.

Figure 4:
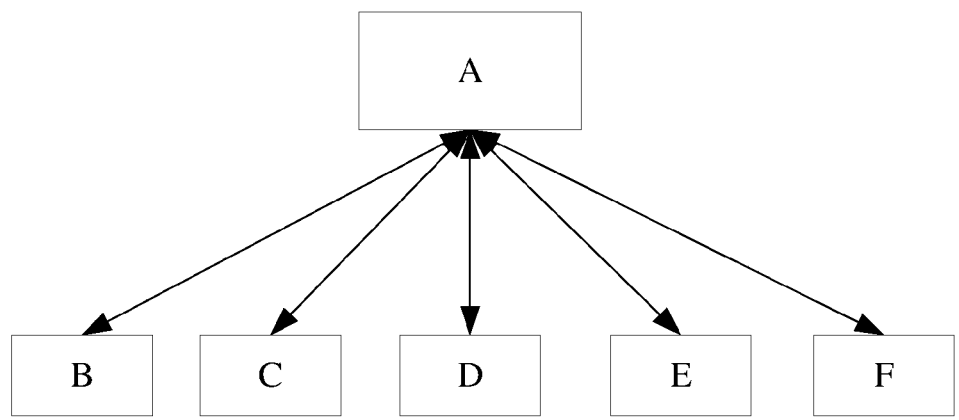
FIG. 4 illustrates a schematic diagram of a common multi-point conference in the related art.

FIG. 4 illustrates a schematic diagram of a common multi-point conference in the related art. As illustrated in FIG. 4, A is a terminal with a built-in MCU or is an MCU, and other terminals are common terminals. Supposing that the common terminals concurrently access A at a high capacity, A will have a situation that call resources or media resources are not enough, and consequently the common terminals cannot concurrently access at a high capacity. The extensibility of the service cannot be comprehensively realized by newly adding a terminal with a built-in MCU or adopting a cascade mode of MCUs, and that will influence concurrent high-capacity access of other terminals.

Figure 5:
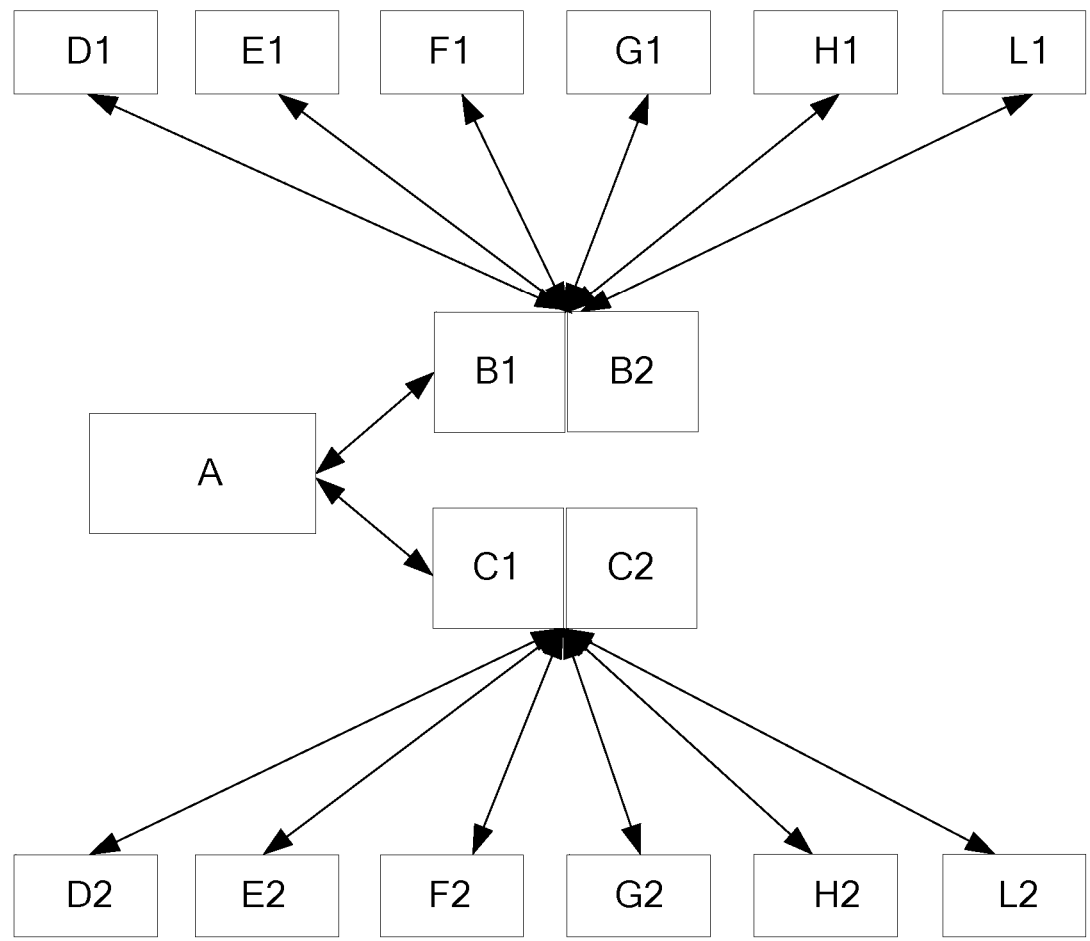
FIG. 5 illustrates a schematic diagram of a cloud conference according to an alternative embodiment.

FIG. 5 illustrates a schematic diagram of a cloud conference according to an alternative embodiment. As illustrated in FIG. 5, in the schematic diagram of the cloud conference, A is a resource scheduling server, B1 and B2 both are cloud servers in area 1, C1 and C2 both are cloud servers in area 2, D1, E1, F1, G1, H1 and L1 are common terminals in area 1, and D2, E2, F2, G2, H2 and L2 are common terminals in area 2. When the common terminals in area 1 access the cloud conference, A searches for the cloud serves in area 1 for access according to a routing configuration rule. When call and media resources of the cloud servers in area 1 are used up, the cloud servers in area 2 may be searched for access. Similarly, when the common terminals in area 2 access the cloud conference, A searches for the cloud servers in area 2 for access according to a routing configuration rule. When call and media resources of the cloud servers in area 2 are used up, the cloud servers in area 1 may be searched for access.

Figure 6:
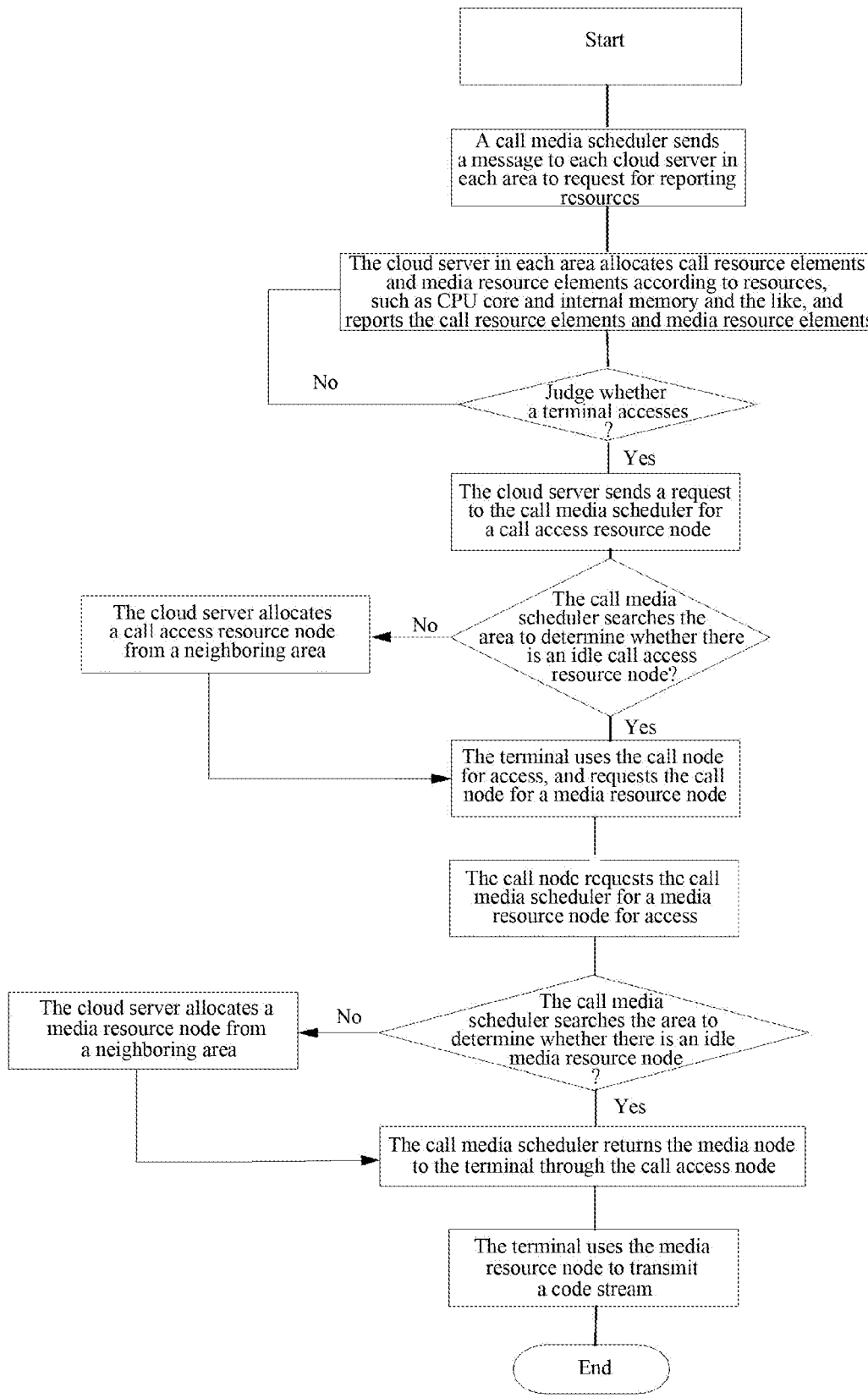
FIG. 6 illustrates a flowchart of balancing a load of call media resources in a cloud conference according to an alternative embodiment.

FIG. 6 illustrates a flowchart of balancing a load of call media resources in a cloud conference according to an alternative embodiment. As illustrated in FIG. 6, a call media resource scheduler sends a message to cloud servers in each area to request for reporting resources, and the cloud servers in each area allocate call resource nodes and media resource nodes according to resources, such as CPU core number and internal memory and the like, and report the call resource nodes and media resource nodes to the call media resource scheduler. Each server in each area periodically detects whether a conference television terminal accesses. If no conference television terminal accesses, each server in each area cyclically and periodically reports idle call resource nodes and media resource nodes of the cloud server; otherwise, the cloud server requests the call media resource scheduler for a call access resource node, and the call media resource scheduler allocates an idle call access resource node according to a routing configuration rule of an area to which the cloud server belongs. If there is no idle call access resource node in this area, an idle call access resource node is continuously allocated from a neighboring area, and idle call access resource node information is returned to the terminal through the cloud server. Then, the terminal accesses through the call access resource node, and the conference television terminal requests the call media resource scheduler for a media node through the call access resource node, and the call media resource scheduler allocates a media resource node according to a media resource allocation rule. That is, the call media resource scheduler firstly allocates a media node from an area in which the call access resource node is located, and if there is no idle media resource node in this area, a media resource node is allocated from a neighboring area, and media resource node information is returned through the call access resource node. The conference television terminal transmits a code stream through the media resource node, and thereby the normal proceeding of the cloud conference is guaranteed.

Through the description of the above-mentioned implementation modes, one skilled in the art may clearly understand that the methods according to the above-mentioned embodiments may be implemented by means of software and a necessary general-purpose hardware platform. Of course, the methods may also be implemented by means of hardware. However, under many situations, the former one is a more normal implementation mode. Based on such understanding, the technical solution of the present disclosure substantively or the part of the technical solution of the present disclosure which makes a contribution to the existing art may be reflected in the form of a software product, and the computer software product is stored in a storage medium (such as an ROM/RAM, a magnetic disk or a compact disk) and includes a plurality of instructions used for enabling one terminal device (which may be a mobile phone, a computer, a server or a network device or the like) to execute the method according to each embodiment of the present disclosure.

An embodiment of the present disclosure further provides a storage medium. In an exemplary embodiment, the storage medium may be configured to store program codes used for executing the above-mentioned embodiments.

In an exemplary embodiment, the storage medium may include but not limited to various mediums, such as USB flash disks, Read-Only Memories (ROMs), Random Access Memories (RAMs), mobile hard disks, magnetic disks or compact disks, which can store program codes.

In an exemplary embodiment, a processor executes the methods of the above-mentioned embodiments according to the program codes stored in the storage medium.

It is apparent to one skilled in the art to understand that all modules or all steps of the present disclosure may be implemented by using general-purpose computing devices, and they may be integrated in a single computing device or distributed on a network consisting of a plurality of computing devices, optionally they may be implemented by using program codes executable for computing devices, thus they may be stored in memory devices and executed by computing devices, and under certain circumstances, the illustrated or described steps may be executed according to a sequence different from the sequence here, or they may be respectively manufactured into integrated circuit modules, or a plurality of modules or steps thereof may be manufactured into a single integrated circuit module to implement. Therefore, the present disclosure is not limited to any specific combination of hardware and software.

The embodiments described above are just alternative embodiments of the present disclosure, and are not used for limiting the present disclosure. For one skilled in the art, the present disclosure may have various modifications and variations. Any modification, equivalent replacement, improvement and the like made within the essence and rule of the present disclosure shall be still included in the protection scope of the present disclosure.

INDUSTRIAL APPLICABILITY

Based on the technical solutions provided by the embodiments of the present disclosure, the scheduler receives the call resource and the media resource reported by the server; the scheduler receives the call resource request of the server, and the scheduler allocates the idle call resource access node in the call resource to the terminal managed by the server according to the call resource request; the scheduler receives the media resource request of the call node corresponding to the call resource access node, and the scheduler allocates the idle media resource access node in the media resource to the terminal according to the media resource request. Therefore, the problem that the number of users accessing a video conference system is limited is solved, and the demand that a great number of users access a conference is satisfied.

What we claim is:

1. A method for balancing a load of a terminal-based conference, comprising:
   receiving, by a scheduler, a call resource and a media resource reported by a server;
   receiving, by the scheduler, a call resource request of the server, and allocating, by the scheduler, an idle call resource access node in the call resource to a terminal managed by the server according to the call resource request; and
   receiving, by the scheduler, a media resource request of a call node corresponding to the call resource access node, and allocating, by the scheduler, an idle media resource access node in the media resource to the terminal according to the media resource request,
   wherein the allocating, by the scheduler, the idle call resource access node in the call resource to the terminal managed by the server comprises:
   allocating, by the scheduler, an idle call resource access node in the call resource to the terminal according to a routing configuration rule of an area to which the server belongs,
   wherein under a situation that there is no idle call resource access node in a call resource of the area, allocating, by the scheduler, an idle call resource access node in the call resource to the terminal according to a routing configuration rule of a neighboring area of the server.

2. The method according to claim 1, wherein before the receiving, by the scheduler, the call resource and the media resource reported by the server, the method comprises:
   sending, by the scheduler, a call media resource request to the server, wherein the call media resource request is used for indicating the server to report the call resource and the media resource to the scheduler.

3. The method according to claim 1, wherein the receiving, by the scheduler, the call resource and the media resource reported by the server comprises:
   receiving, by the scheduler, the call resource and the media resource cyclically reported by the server according to preset time.

4. The method according to claim 1, wherein the allocating, by the scheduler, the idle media resource access node in the media resource to the terminal comprises:
   allocating, by the scheduler, an idle media resource access node to the terminal according to an allocation rule of the media resource of an area to which the call resource access node belongs.

5. The method according to claim 4, wherein the method comprises:
   under a situation that there is no idle media resource access node in the media resource of the area, allocating, by the scheduler, the idle media resource access node to the terminal according to an allocation rule of the media resource of a neighboring area of the call resource access node.

6. A device for balancing a load of a terminal-based conference, comprising: a processor and a storage; wherein the storage stores a processor-executable program executed by the processor, and the program comprises:
   a receiving module configured to receive a call resource and a media resource reported by a server;
   a call allocation module configured to receive a call resource request of the server, and allocate, by a scheduler, an idle call resource access node in the call resource to a terminal managed by the server according to the call resource request; and
   a media allocation module configured to receive a media resource request of a call node corresponding to the call resource access node, and allocate, by the scheduler, an idle media resource access node in the media resource to the terminal according to the media resource request,
   wherein the call allocation module comprises:
   a first call allocation unit configured to allocate the idle call resource access node in the call resource to the terminal according to a routing configuration rule of an area to which the server belongs; and
   a second call allocation unit configured to, under a situation that there is no idle call resource access node in a call resource of the area, allocate the idle call resource access node in the call resource to the terminal according to a routing configuration rule of a neighboring area of the server.

7. The device according to claim 6, wherein the program further comprises:
   a request module configured to send a call media resource request to the server, wherein the call media resource request is used for indicating the server to report the call resource and the media resource to the device.

8. The device according to claim 6, wherein the program further comprises:
   a report module configured to receive the call resource and the media resource cyclically reported by the server according to preset time.

9. The device according to claim 6, wherein the media allocation module comprises:
   a first media allocation unit configured to allocate the idle media resource access node to the terminal according to an allocation rule of the media resource of an area to which the call resource access node belongs.

10. The device according to claim 9, wherein the media allocation module comprises:

a second media allocation unit configured to, under a situation that there is no idle media resource access node in the media resource of the area, allocate the idle media resource access node to the terminal according to an allocation rule of the media resource of a neighboring area of the call resource access node.

11. A non-transitory computer-readable storage medium storing computer-executable instructions, which when executed by a processor, cause the processor to perform a method for balancing a load of a terminal-based conference, the method comprising:
   receiving, by a scheduler, a call resource and a media resource reported by a server;
   receiving, by the scheduler, a call resource request of the server, and allocating, by the scheduler, an idle call resource access node in the call resource to a terminal managed by the server according to the call resource request; and
   receiving, by the scheduler, a media resource request of a call node corresponding to the call resource access node, and allocating, by the scheduler, an idle media resource access node in the media resource to the terminal according to the media resource request,
   wherein the allocating, by the scheduler, the idle call resource access node in the call resource to the terminal managed by the server comprises:
   allocating, by the scheduler, an idle call resource access node in the call resource to the terminal according to a routing configuration rule of an area to which the server belongs,
   wherein under a situation that there is no idle call resource access node in a call resource of the area, allocating, by the scheduler, an idle call resource access node in the call resource to the terminal according to a routing configuration rule of a neighboring area of the server.

* * * * *